United States Patent [19]

Hongo et al.

[11] Patent Number: 5,510,217
[45] Date of Patent: Apr. 23, 1996

[54] GALLIUM PHTHALOCYANINE HALIDE CRYSTALS, METHOD FOR PREPARING THE SAME AND ELECTROPHOTOGRAPHIC PHOTORECEPTOR USING THE SAME

[75] Inventors: Kazuya Hongo; Katsumi Nukada; Masakazu Iijima; Noriyoshi Takahashi; Masaaki Suwabe; Hitoshi Takimoto, all of Minamiashigara, Japan

[73] Assignee: Fuji Xerox Co., Ltd., Tokyo, Japan

[21] Appl. No.: 315,858

[22] Filed: Sep. 30, 1994

[30] Foreign Application Priority Data

Oct. 1, 1993 [JP] Japan ................. 5-267775

[51] Int. Cl.$^6$ .................... G03G 5/04; C09B 47/04
[52] U.S. Cl. .................... 430/58; 430/78; 540/141
[58] Field of Search .................. 430/58, 59, 73, 430/78; 540/141

[56] References Cited

U.S. PATENT DOCUMENTS

| | | | |
|---|---|---|---|
| 2,770,629 | 11/1956 | Eastes | 260/314.5 |
| 3,160,635 | 12/1964 | Knudsen et al. | 260/314.5 |
| 3,357,989 | 12/1967 | Byrne et al. | 260/314.5 |
| 3,708,292 | 1/1973 | Brach et al. | 260/314.5 |
| 5,358,813 | 10/1994 | Iijima et al. | 430/59 |

FOREIGN PATENT DOCUMENTS

| | | |
|---|---|---|
| 44-14106 | 6/1969 | Japan . |
| 48-34189 | 5/1973 | Japan . |
| 49-4338 | 1/1974 | Japan . |
| 49-105536 | 10/1974 | Japan . |
| 57-148745 | 9/1982 | Japan . |
| 58-21416 | 2/1983 | Japan . |
| 61-151659 | 7/1986 | Japan . |
| 2-87154 | 3/1990 | Japan . |
| 4-227768 | 8/1992 | Japan . |
| 5-98181 | 4/1993 | Japan . |

Primary Examiner—John Goodrow
Attorney, Agent, or Firm—Oliff & Berridge

[57] ABSTRACT

Gallium phthalocyanine halide crystals wherein a part of the crystals are changed into hydroxygallium phthalocyanine is disclosed. A method for preparing gallium phthalocyanine halide crystals wherein gallium phthalocyanine halide crystals are brought into contact with water and a part of the crystals are changed into hydroxygallium phthalocyanine is also disclosed. An electrophotographic photoreceptor formed by laminating at least a charge generating layer and a charge transporting layer successively on a conductive support wherein the charge generating layer contains gallium phthalocyanine halide crystals An which a part of the crystals are changed into hydroxygallium phthalocyanine is also disclosed.

21 Claims, 3 Drawing Sheets

GALLIUM PHTHALOCYANINE HALIDE CRYSTALS, METHOD FOR PREPARING THE SAME AND ELECTROPHOTOGRAPHIC PHOTORECEPTOR USING THE SAME

FIELD OF THE INVENTION

The present invention relates to gallium phthalocyanine halide crystals, a method for preparing the same and an electrophotographic photoreceptor using the same as a charge generating material.

BACKGROUND OF THE INVENTION

Regarding photoconductive materials used in an electrophotographic photoreceptor, various inorganic and organic photoconductive materials have been known, when the organic photoconductive materials are used for an electrophotography, they have advantages such as film transparency, good film making property, flexibility and good cost-performance. When the organic photoconductive materials are used, a laminate type electrophotographic photoreceptor which is function-separated into a charge generating layer and a charge transporting layer has been proposed in order to improve sensitivity and durability of the photoreceptor.

Recently, the demand for extending the light-sensitive wavelength range of organic photoconductive materials which have heretofore been proposed up to the near infrared wavelength range of semiconductor lasers (780 to 830 nm) so as to use the materials as a photoreceptor for a digital recording system such as a laser printer. From the view point, squalilium compounds (as disclosed, e.g., In JP-A-49-105536 and JP-A-58-21416), triphenylamine trisazo compounds (as disclosed In JP-A-61-151659) and phthalocyanine compounds (as disclosed, e.g., In JP-A-48-34189 and JP-A-57-148745) have been proposed as photoconductive materials for semiconductor lasers.(the term "JP-A" as used herein means an "unexamined published Japanese patent application")

Where organic photoconductive materials are used as light-sensitive materials for semiconductor lasers, they are needed to satisfy the conditions that the light-sensitive wavelength range is extended up to a long wavelength range and that the sensitivity and durability of the photoreceptors to be formed therefrom are good. The above-mentioned organic photoconductive materials do not sufficiently meet the conditions.

In order to overcome these drawbacks, the abovementioned organic photoconductive materials have been researched and Investigated energetically. In particular, many reports relating to phthalocyanine compounds have heretofore been disclosed.

In general, it Is known that phthalocyanine compounds have various crystal forms, depending upon the difference in the manufacture method and treating method, and that the difference in the crystal form has a great influence on the photoelectric conversion characteristics of phthalocyanine compounds. Regarding crystal forms of phthalocyanine compounds, for example, with respect to copper phthalocyanine, various crystal forms of α, ε, π, x, ρ, γ and δ are known in addition to a stable crystal form of β. It is also known That these crystal forms are mutually transferable to each other by mechanical strain force, sulfuric acid treatment, organic solvent treatment or heat treatment, (as described, e.g., in U.S. Pat. Nos. 2,770,629, 3,160,635, 3,708,292 and 3,357,989). Regarding metal-free phthalocyanine, crystal forms such as α, β, γ, τ and x are Known and the x type phthalocyanine is described In JP-B-44-14106, JP-B-49-4338 and JP-A-4-227768. (the term "JP-B" as used herein means an "examined published Japanese patent application") In these specifications, it is disclosed that the x crystal form of phthalocyanine has a good electrophotographic characteristics compared to another crystal form of metal-free phthalocyanine and is good in the dispersibility in a binder resin. However, the x type phthalocyanine is still insufficient in the point of sensitivity.

On the other hand, some novel crystal forms of high sensitive gallium phthalocyanine halide have been proposed in JP-A-5-98181.

However, the above gallium phthalocyanine halide crystals are not always sufficient in the dispersibility in binder resins and have problems on the stability of the dispersion and they often cause drawbacks of fog or black spots in images formed. Thus, a further improvement has been desired.

On the other hand, as a general improving method of the dispersibility of pigments, there exist modifications of pigment surface by additives such as silane coupling agent or titanate coupling agent or pigment surface treatment by plasma CVD. The former causes decrease of sensitivity and increase of the residual potential, and the latter makes the process complicated and increases the manufacturing cost and thus these methods have no practical use.

The present invention has been made in view of the above-mentioned situation.

SUMMARY OF THE INVENTION

One object of the present invention is to provide gallium phthalocyanine halide which shows a high sensitive and good electrophotographic characteristics and has good dispersibility in binder resins and to provide a method for preparing the same.

Another object of the present invention is to provide an electrophotographic photoreceptor having high sensitivity characteristics and good charge retentiveness and image characteristics.

As a result of earnest investigations, the present inventors have found That the above-mentioned objects of the present invention may be attained by using a pigment in which a part of crystals of gallium phthalocyanine halide is changed Into hydroxygallium phthalocyanine as a charge generating material and have completed the present invention.

The gallium phthalocyanine halide crystals of the present Invention are characterized in that a part of the crystals is changed Into hydroxygallium phthalocyanine. The gallium phthalocyanine halide crystals of the present invention (which are referred To as "modified gallium phthalocyanine halide crystals" hereinafter) may be prepared by contacting gallium phthalocyanine halide crystals and water and changing a part of the crystals into hydroxygallium phthalocyanine.

The electrophotographic photoreceptor or the present invention is formed by laminating at least a charge generating layer and a charge transporting layer successively on a conductive support, and is characterized in that the charge generating layer contains gallium phthalocyanine halide crystals in which a part of crystals is changed into hydroxygallium phthalocyanine.

DETAILED DESCRIPTION OF THE INVENTION

Figure 1:
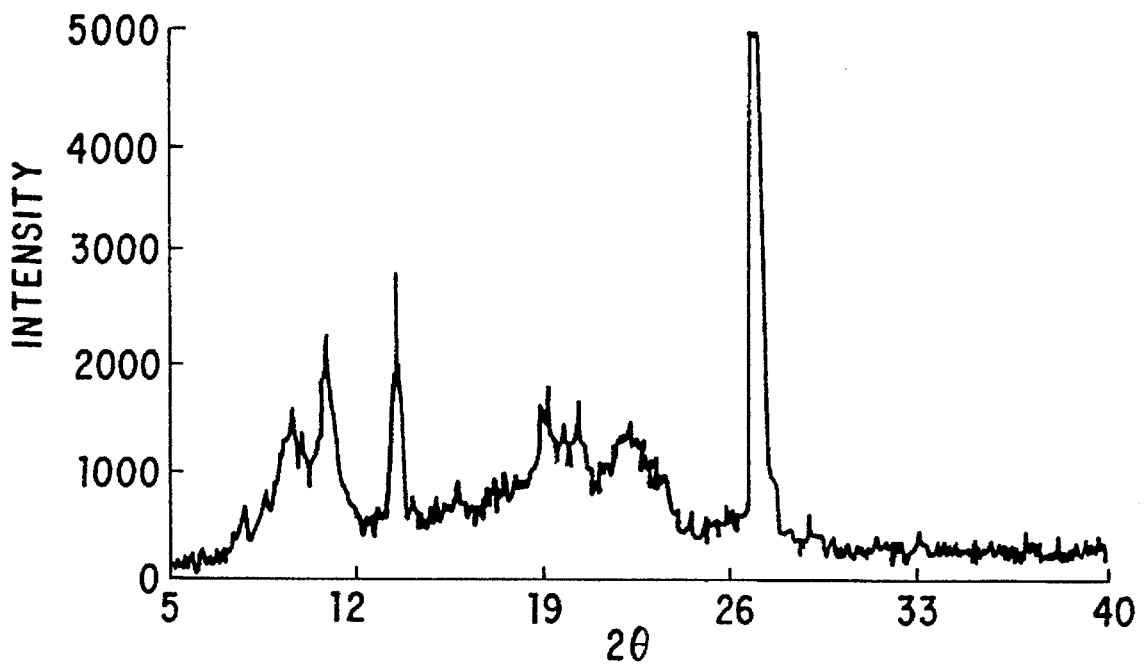
FIG. 1 is a powder X-ray diffraction pattern of chlorogallium phthalocyanine crystals obtained in Synthesis Example 1.

The present invention will be detailed hereinafter.

First, mollified gallium phthalocyanine halide crystals of the present invention will be explained.

The modified gallium phthalocyanine halide crystals are those in which a part of the crystals is changed into hydroxygallium phthalocyanine and comprise either (1) crystals having distinct diffraction pears at 11.0', 13.5' and 27.1', (2) crystals having distinct diffraction peaks at 7.4°, 16.8°, 25.5° and 28.3°, (3) crystals having distinct diffraction peaks at 6.8°, 17.3°, 23.6° and 26.9° or (4) crystals having distinct diffraction peaks at 8.7 to 9.2°, 17.8°, 27.4° and 28.8° of the Bragg angle (2θ±0.2°) with respect to CuKα characteristic X-ray, or a mixed crystals comprising two or more of them.

In the present invention, the term "a part of the crystals" which are changed into hydroxygallium phthalocyanine means that the halogen content in the elemental analysis values of the mollified gallium phthalocyanine halide crystals is in the range from 10 To 99.9%, preferably in the range from 50 to 99%, more preferably in the range from 80 to 95%.

The preparation of obese modified gallium phthalocyanine halide crystals will be explained by way of example in the case of chlorogallium phthalocyanine. First, Chlorogallium phthalocyanine crystals are synthesized by condensing 1,3-diimino isoindoline and gallium trichloride in quinoline. The chlorogallium phthalocyanine crystals obtained are then treated by way of, e.g., stirring in water, agitation and dispersion, by which chlorogallium phthalocyanine crystals having the above crystal form (1) may be obtained. Regarding the water used in the case, deionized water or distilled water are preferable.

Further, the chlorogallium phthalocyanine crystals having the above crystal forms of (2) to (4) may preferably obtained as follows: Namely, the chlorogallium phthalocyanine crystals obtained by the above synthesis is crystal transferred into a desired crystal form and treated with water. Thus after dry grinding the above chlorogallium phthalocyanine crystals obtained by synthesis in a milling device such as a vibration mill, an automatic mortar, a sand mill, an attritor, a ball mill, in the case of the above (2) crystal forms, wet grinding may be effected with the above milling device in a suitable solvent such as benzyl alcohol, isopropyl alcohol, cyclohexanone, toluene, dimethylsulfoxide, butyl acetate, in the case of the above (8) crystal form, wet grinding my be effected in a halide solvent such as methylene chloride, chloroform, carbon tetrachloride, 1,1,1-trichloroethane, 1,1,2-trichloroethylene and in the case of the above (4) crystal form, wet grinding my be effected in methanol or ethanol. The chlorogallium phthalocyanine crystals having the above (2) to (4) crystal forms in which crystal transfers have been made are treated by way of, e.g., such as a stirring in water, agitation and dispersion to obtain chlorogallium phthalocyanine crystals having desired crystal forms.

The chlorogallium phthalocyanine crystals having the above (2) to (4) crystal forms may be obtained by carrying out a wet treatment of the chlorogallium phthalocyanine crystals having the (1) crystal form obtained by a treatment with water as described above with the same solvent as described above to carry out crystal transfer into chlorogallium phthalocyanine crystals having a desired crystal form. In addition, the stirring treatment in water may be carried out after wet grinding. Further, a stirring treatment in a boiling water with heating may be carried out or a wet treatment using water as a solvent may be carried out.

The reason why when gallium phthalocyanine halide crystals are brought into contact with water to be treated, a part of the crystals is changed into hydroxygallium phthalocyanine, is that the gallium phthalocyanine halide is easy to hydrolyze. Namely, by stirring in water, the crystal surface in contact with water reacts with water easily and is changed into hydroxygallium phthalocyanine. At the time, since the pigment bulk does not contact with water, it keeps the gallium phthalocyanine halide state.

By changing a part of the crystals into hydroxygallium phthalocyanine, the inferiority of dispersibility in binder resin is improved with keeping the high sensitive characteristics of gallium phthalocyanine halide crystals.

it is considered that the static polarity of gallium phthalocyanine halide is Inclined remarkably toward negative and it can not harmonize with the polarity of the binder resin or solvent, the gallium phthalocyanine halide crystals are easy to agglomerate and deteriorate the dispersibility. Therefore, by changing a part of the crystals into hydroxygallium phthalocyanine, the polarity becomes weak and It can harmonize with the binder resin or solvent statically, the gallium phthalocyanine halide crystals are not easy to agglomerate and thus the dispersibility is improved. Further, the contact treatment with water has an effect on the improvement of the dispersibility since the ionic impurities in the gallium phthalocyanine halide crystals which deteriorate the dispersibility are deleted by the treatment.

The electrophotographic photoreceptor of the present invention using the above-mentioned modified gallium phthalocyanine halide crystals will be explained.

In the electrophotographic photoreceptor of the present invention, as a conductive support, any material used in an electrophotographic photoreceptor may be used. Further, depending on the necessity, various treatments of the conductive support surface may be carried out so long as they have no influence on the image quality. For example, anodizing treatment of surface, rough surface treatment by, e.g., a liquid honing, chemical treatment, coloring treatment may be employed.

On The conductive support, a light-sensitive layer in which at least a charge generating layer and a charge transporting layer are laminated is formed. As for the order of lamination, either layer may be formed on the conductive support side.

In the present invention, the charge generating layer may be formed by dispersing the above-mentioned modified gallium phthalocyanine halide crystals into a suitable binder resin. In the case, the binder resin may not exist. In addition, the modified gallium phthalocyanine halide crystals may be contained along with another known charge generating material.

As the binder resin, any known resin may be used such as polycarbonate, polystyrene, polyester, methacrylic acid ester polymer, polyvinyl butyral, polyvinyl formal, vinyl acetate polymer, vinyl chloride-vinyl acetate copolymer, cellulose ester, cellulose ether, polybutadiene, polyurethane, epoxy resin.

The ratio (by weight) of the charge generating material to the binder resin is in the range from 40/1 to 1/4, and preferably from 20/1 to 1/2. If the ratio of the charge generating material is too high, the stability of the coating composition will decrease. If it is too low, the sensitivity will decreased. Thus it is preferable to set the ratio within the above range.

As the solvent for making the coating composition, organic solvents such as methanol, ethanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, benzene, toluene, xylene, chlorobenzene, dimethyl formamide, dimethyl acetamide or the mixed solvent of two or more of them. For dispersing method, for example, sand mill dispersion method, colloid mill dispersion method, attritor dispersion method, ball mill dispersion method, dyno-mill dispersion method, coball-mill dispersion method and roll mill dispersion method may be employed. For coating method, for example, blade coating method, wire bar coating method, spray coating method, dip coating method, bead coating method and curtain coating method may be employed.

The thickness of the charge generating layer is appropriate in the range from 0.01 to 5 μm, preferably in the range from 0.03 to 2 μm.

The charge transporting layer comprises charge transporting material and film making resin. As the charge transporting material, any known charge transporting materials can be used, for example. N,N'-diphenyl-N,N'-bis(m-tolyl)benzidine, 4-diethylaminobenzaldehyde-2,2-diphenylhydrazone and p-(2,2-diphenylvinyl)-N,N,-diphenylaniline. As the film making resin, for example, polycarbonate, polyarylate, polystyrene, polyester, styrene-acrylonitrile copolymers, polysulfone, polymethacrylate ester, styrene-methacrylate ester copolymers and polyolefin may be used. Among them polycarbonate is preferable in the point of the durability.

The ratio (by weight) of the charge transporting material to the film making resin is from 5/1 to 1/5 and preferably from 3/1 to 1/3. If the ratio of the charge transporting material is too high, the mechanical strength of the charge transporting layer will decrease, if it is too low, the sensitivity will decreased and thus it is preferable to set the ratio within the above range. In addition, if the charge transporting material has a film making property, the above film making resin may be omitted.

The charge transporting layer may be formed by dissolving the above charge transporting material and the above film making resin in an appropriate solvent and coating them. The thickness of the layer is set from 5 to 50 μm, preferably from 10 to 40 μm.

For the coating, any method described for the above charge generating layer may be employed.

In the electrophotographic photoreceptor of the invention, a subbing layer my be provided between the photosensitive layer and the conductive support if desired. The subbing layer is effective for inhibiting injection of any unnecessary charges from conductive support and has a function of improving the charging property of the photoreceptor. In addition, it also has another function of elevating the adhesiveness between the light-sensitive layer and conductive support. Examples of materials of forming the subbing layer Include polyvinyl alcohol, polyvinyl pyrrolidone, polyvinyl pyridine, cellulose ethers, cellulose esters, polyamide, polyurethane, casein, gelatin, polyglytamic acid, starch, starch acetate, amino starch, polyacrylic acid and polyacrylamide. Further, organic zirconium compounds such as zirconium chelate compounds and zirconium alkoxide compounds and silane coupling agents may be used in place of the above resins.

Representative examples of the organic zirconium compounds may include zirconium tetrabutoxide, zirconium tetraacetyl acetonate, zirconium dipropoxy diacetyl acetonate and tributoxy zirconium acetyl acetate.

Examples of the silent coupling agents may include vinyltrichloro silane, vinyltrimethoxy silane, vinyltriethoxy silane, vinyltris-2-methoxy ethoxy silane, vinyltriacetoxy silane, γ-glycidoxy propyl trimethoxy silane, γ-methacryloxy propyltrimethoxy silane, γ-aminopropyl triethoxy silane. γ-chloropropyltrimethoxy silane, γ-2-aminoethyl propyltrimethoxy silane, γ-mercaptopropyl trimethoxy silane, γ-ureide propyl triethoxy silane, β-3,4-epoxy cyclohexylethyl trimethoxy silane.

The mixing ratio of the organic zirconium compound to the silane coupling agent is 1/1 to 5/1 in Zr/Si molar ratio. If the Zr ratio becomes larger than the above range, wetting characteristics will deteriorate when a charge generating layer is coated and ununiform coated film will be formed. In addition, if the Si ratio becomes larger than the above range, residual potential will Increase and thus it is not preferable.

On the other hand, a mixture of the organic zirconium compound, the silane coupling agent and the binder resin my be used. In this case, as the binder resin, the above mentioned hinder resins may be used. The mixing ratio of the binder resin to the organic zirconium compound and the silane coupling agent may be set depending on the necessity. If the film thickness of the subbing layer is required to be thick, the binder resin amount may be increased, and if the film thickness of the subbing layer is required to be thin, the amount may he decreased.

Further, as a subbing layer, a layer formed by coating a solution in which fine divided inorganic powder and the above binder resin are mixed and dispersed, and drying may be formed. Specific examples of the fine divided inorganic powder may include titanium oxide, antimony oxide, stannous oxide, zinc oxide, aluminium oxide, indium oxide, magnesium oxide, silica, molybdenum trioxide and copper oxide.

In the present invention, the thickness of the subbing layer is set from 0.01 to 5 μm and preferably from 0.01 to 2 μm. For forming a subbing layer, a coating composition is required to be prepared but an alcohol such as ethanol, methanol, propanol and butanol, a ketone such as acetone and methyl ethyl ketone, an aromatic hydrocarbons such as toluene and xylene and an ester such as ethyl acetate and cellosolve acetate may be used alone or in combination of two or more of them.

For coating the coating composition, for example, did coating method, spray coating method, blade coating method, spinner coating method, bead coating method, curtain coating method may be employed. Drying of the coated composition may be effected at a temperature of from 10° to 200° C., preferably from 80° to 180° C. for a period from 5 minutes to 6 hours, preferably from 10 minutes to 2 hours with a blow dryer or by drying under static condition.

Further, the electrophotographic photoreceptor of the present invention may comprise a protective layer formed on the light-sensitive layer to improve resistance to printing.

The electrophotographic photoreceptor of the present invention may be used effectively for an electrophotographic copy machine but may also be applicable for laser beam printer, a LED printer, a CRT printer, a microfilm reader, a normal paper facsimile machine, an electrophotoengraving system or the like.

The present invention will be explained in more detail by way of the following examples, which, however, are not intended to restrict the scope of the present invention. Unless otherwise specifically defined, all "parts" therein are weight.

SYNTHESIS EXAMPLE 1

30 parts of 1,3-diiminoisoindoline and 9.1 parts of gallium trichloride were put in 230 parts of quinoline and reacted for 3 hours at 200° C. The product formed was taken out by filtration and then washed with N-dimethylformamide and methanol. The wet cake formed was dried to obtain 28 parts of chlorogallium phthalocyanine crystals. The powder X-ray diffraction pattern of the chlorogallium phthalocyanine crystals is shown in FIG. 1 and the data of elementary analysis of them are as follows. The value in the parenthesis shows percentage (%) of calculated values (%) to theoretical values (%) for the chlorine content.

TABLE 1

|  | C | H | N | Cl | |
| --- | --- | --- | --- | --- | --- |
| Theoretical (%) | 62.22 | 2.61 | 18.14 | 5.74 | |
| Calculated (%) | 62.18 | 2.67 | 18.08 | 5.75 | (100%) |

SYNTHESIS EXAMPLE 2

Figure 2:
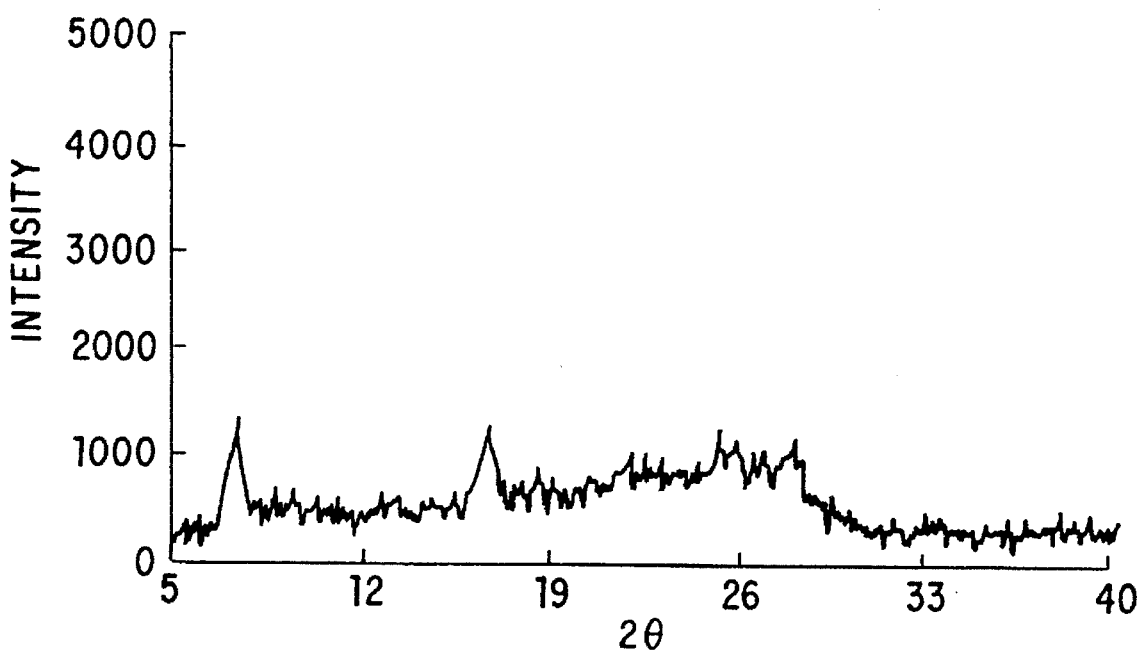
FIG. 2 is a powder X-ray diffraction pattern of chlorogallium phthalocyanine crystals obtained in Synthesis Example 2.

3 parts of the chlorogallium phthalocyanine crystals obtained in the above Synthesis Example 1 were ground in an automatic mortar grinder (Lab Mill UT-21, manufactured by Yamato Kagaku Co.) for 3 hours. The powder X-ray diffraction pattern of the chlorogallium phthalocyanine crystals is shown in FIG. 2.

SYNTHESIS EXAMPLE 3

Figure 3:
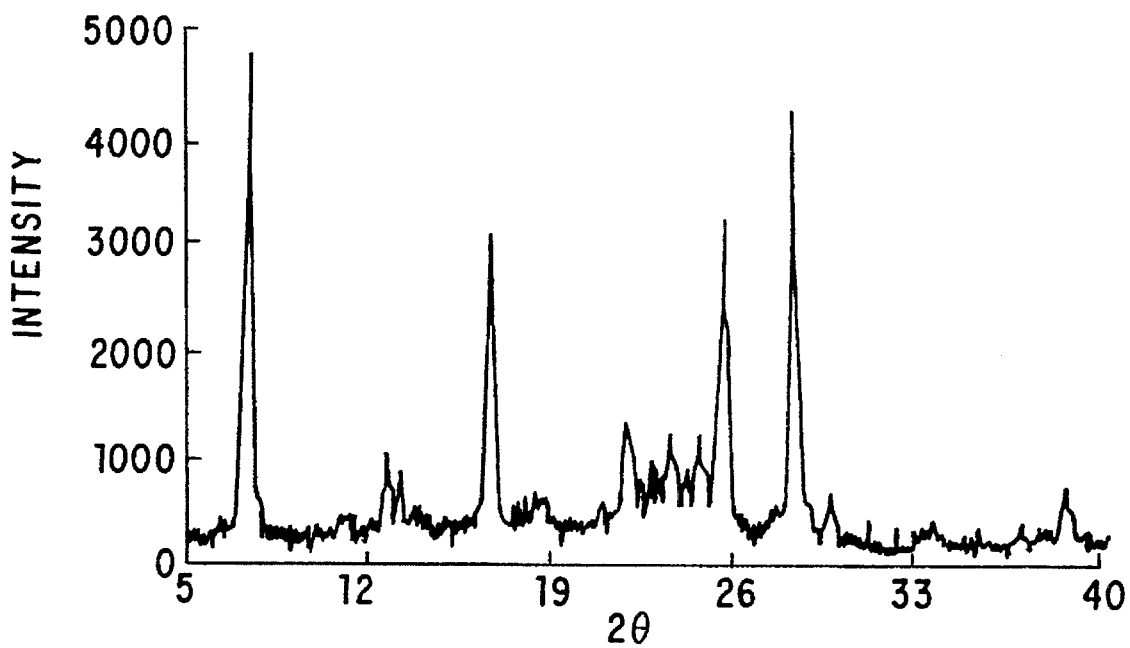
FIG. 3 is a powder X-ray diffraction pattern chlorogallium phthalocyanine crystals obtained in Synthesis Example 3.

0.5 part of chlorogallium phthalocyanine crystals obtained in The above Synthesis Example 2 were ball-milled in 20 parts of benzyl alcohol along with 60 parts of 1 mm-diameter glass beads at room temperature for 24 hours, and the milled crystals were separated by filtration. These were then washed with 100 parts of ethyl acetate to obtain chlorogallium phthalocyanine crystals. The powder X-ray diffraction pattern of the chlorogallium phthalocyanine crystals Is shown in FIG. 3.

SYNTHESIS EXAMPLE 4

Figure 4:
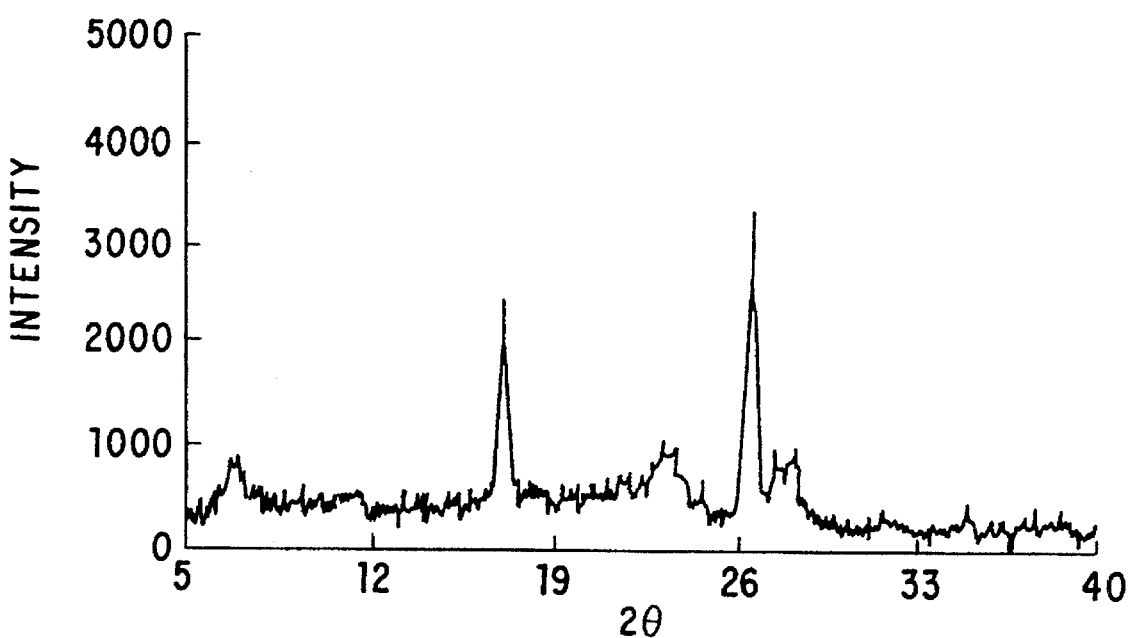
FIG. 4 is a powder X-ray diffraction pattern of chlorogallium phthalocyanine crystals obtained in Synthesis Example 4.

3 part of chlorogallium phthalocyanine crystals obtained in the above Synthesis Example 2 were ball-milled in 20 parts of methylene chloride along with 60 parts of 1 mm-diameter glass beads at room temperature for 24 hours, and the milled crystals were separated by filtration. These were then washed with 100 parts of ethyl acetate to obtain chlorogallium phthalocyanine crystals. The powder X-ray diffraction pattern of the chlorogallium phthalocyanine crystals is shown in FIG. 4.

SYNTHESIS EXAMPLE 5

Figure 5:
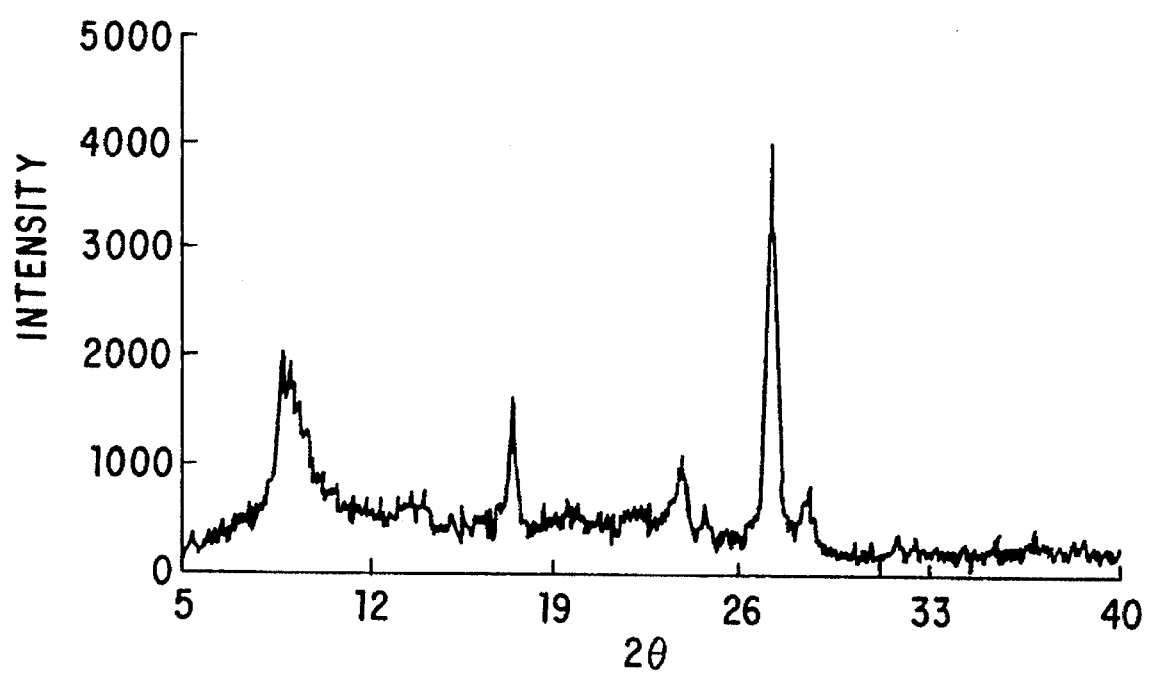
FIG. 5 is a powder X-ray diffraction pattern of chlorogallium phthalocyanine crystals obtained in Synthesis Example 5.

3 part of chlorogallium phthalocyanine crystals obtained in the above Synthesis Example 2 were ball-milled in 20 parts of methanol along with 80 parts of 1 mm-diameter glass beads at room temperature for 24 hours, and the milled crystals were separated by filtration. These were then washed with 100 parts of methanol to obtain chlorogallium phthalocyanine crystals. The powder X-ray diffraction pattern of the chlorogallium phthalocyanine crystals obtained is shown in FIG. 5.

EXAMPLE 1

5 parts of chlorogallium phthalocyanine crystals obtained in the above Synthesis Example 1 was stirred along with 100 parts of deionized water (pH:7.4) at room temperature for 24 hours. At this time, the pH value of the supernatant was measured by a pH meter, a value of 3.5 was shown. Then the milled crystals were separated by filtration to obtain chlorogallium phthalocyanine crystals In which a part of the crystals were changed into hydroxygallium phthalocyanine. The powder X-ray diffraction pattern of the chlorogallium phthalocyanine crystals obtained showed the same spectrum as shown In FIG. 1.

The data of elementary analysis thereof were as follows.

|  | C | H | N | Cl | |
| --- | --- | --- | --- | --- | --- |
| Theoretical (%) | 62.22 | 2.61 | 18.14 | 5.74 | |
| Calculated (%) | 61.98 | 2.72 | 18.10 | 5.31 | (93%) |

From the above data of elementary analysis, it was confirmed that the chlorine content is decreased and hydrolysis of the chlorogallium phthalocyanine crystals was undoubtedly occurred. In addition, from The pH value of the supernatant, it was proved that it was changed to be acid by the effect of hydrogen chloride produced by the hydrolysis.

EXAMPLE 2

0.5 part of chlorogallium phthalocyanine crystals obtained in the above Synthesis Example 2 was heated with stirring along with 20 parts of deionized water at 100° C. for 2 hours. At this time, the pH value of the supernatant was measured by a pH meter, a value of 3.9 was shown. Then the milled crystals were separated by filtration to obtain chlorogallium phthalocyanine crystals In which a part of the crystals were changed into hydroxygallium phthalocyanine. The powder X-ray diffraction pattern of the chlorogallium phthalocyanine crystals obtained showed the same spectrum as shown in FIG. 2.

The data of elementary analysis thereof were as follows.

|  | C | H | N | Cl | |
| --- | --- | --- | --- | --- | --- |
| Theoretical (%) | 62.22 | 2.61 | 18.14 | 5.74 | |
| Calculated (%) | 62.08 | 2.75 | 18.09 | 5.23 | (91%) |

EXAMPLE 3

0.5 part of chlorogallium phthalocyanine crystals obtained in the above Synthesis Example 3 was heated with stirring along with 25 parts of distilled water at 100° C. for 2 hours. At this time, the pH value of the supernatant was measured by a pH meter, a value of 4.4 was shown. Then the milled crystals were separated by filtration to obtain chlorogallium phthalocyanine crystals in which a part of the crystals were changed into hydroxygallium phthalocyanine. The powder X-ray diffraction pattern of the obtained chlorogallium phthalocyanine crystals showed the same spectrum as shown in FIG. 3. The data of elementary analysis thereof were as follows.

|  | C | H | N | Cl |  |
|---|---|---|---|---|---|
| Theoretical (%) | 62.22 | 2.61 | 18.14 | 5.74 |  |
| Calculated (%) | 62.18 | 2.70 | 18.06 | 5.15 | (90%) |

EXAMPLE 4

3 parts of chlorogallium phthalocyanine crystals obtained in the above Synthesis Example 4 was ball-milled along with 60 parts of 2 mm-diameter glass beads in 20 parts of deionized water at room temperature for 24 hours. At this time, the pH value of the supernatant was measured by a pH meter, a value of 3.4 was shown. Then the milled crystals were separated by filtration and washed with 10 pares of deionized water to obtain chlorogallium phthalocyanine crystals in which a part of the crystals was changed into hydroxygallium phthalocyanine. The powder X-ray diffraction pattern of the obtained chlorogallium phthalocyanine crystals showed the same spectrum as shown in FIG. 4. The data of elementary analysis thereof were as follows.

|  | C | H | N | Cl |  |
|---|---|---|---|---|---|
| Theoretical (%) | 62.22 | 2.61 | 18.14 | 5.74 |  |
| Calculated (%) | 62.11 | 2.69 | 18.06 | 5.10 | (89%) |

EXAMPLE 5

0.5 part of chlorogallium phthalocyanine crystals obtained In the above Synthesis Example 5 was heated with stirring alone with 20 parts of distilled water at room temperature for 24 hours. At this time, the pH value of the supernatant was measured by a pit meter, a value of 4.2 was shown. Then the milled crystals were separated by filtration to obtain chlorogallium phthalocyanine crystals in which a part of the crystals was changed into hydroxygallium phthalocyanine, The powder X-ray diffraction pattern of the obtained chlorogallium phthalocyanine crystals showed the same spectrum as shown in FIG. 5. The data of elementary analysis thereof were as follows.

|  | C | H | N | Cl |  |
|---|---|---|---|---|---|
| Theoretical (%) | 62.22 | 2.61 | 18.14 | 5.74 |  |
| Calculated (%) | 62.14 | 2.65 | 17.99 | 5.17 | (90%) |

EXAMPLE 6

First, the wetting honing treatment as described in JP-A-2-87154 was carried out as follows: preparing a 40 mm$\phi$× 319 mm of specular surface aluminium pipe and using a liquid honing device, a wet-honing treatment was carried out by suspending 10 kg of grinding agent (green desick GC#400, manufactured by Shows Denko Co.) into 40L of water, feeding it at a flowing rate of 6L/min. with a pump, spraylag it at a spraying rate of 60mm/min. and air pressure of 0.85 kgf/cm$^2$, and moving it In the axial direction with rotating the aluminium pipe at 100 rpm. At the time, average roughness center line Ra was 0.15 μm. Then 8 parts of polyvinyl butyral (S-Lee BM-1, manufactured by Seklsui Chemical Co.) was added to 152 parts of n-butyl alcohol and dissolved with stirring to prepare 5% by weight of polyvinyl butyral solution. Then a mixed solution of 50% toluene solution of tributoxy zirconium/acetyl acetate (ZC540, manufactured by Matsmoro Kosho Co.), 10 parts of γ-amino propyl triethoxy silane (MI10, manufactured by Nihon Unicar Co.) and 130 parts of n-butyl alcohol was added to the above polyvinylbutyral solution and stirred using a stirring device to prepare a coated composition for forming a subbing layer. The coated composition is dip coated on the aluminium pipe and heated and dried at 165° C. for 15 minutes to form a subbing layer having a thickness of 1.5 μm.

On the other hand, one part of chlorogallium phthalocyanine crystal obtained in Example 1 was added to a solution of 3 parts of vinyl chloride-vinyl acetate copolymer resin (VMCH, manufactured by Union Carbide Co.) pre-dissolved in 100 parts of n-butylalcohol, dispersed by a sand mill for 24 hours, and diluted with n-butylalcohol to prepare a coated composition for forming a charge generating layer having a solids concentration of 3.0% by weight. The coated composition obtained was coated on the subbing layer with a ring coating device and heated and dryed at 100° C. for 10 minutes to form a charge generating layer having a thickness of 0.20 μm. Further, determining the crystal form of the chlorogallium phthalocyanine crystals after dispersion by an X-ray diffraction. It was the same as the crystal form before the dispersion and it was confirmed that it did not change at all.

Then a charge transporting layer was formed on the charge generating layer formed. Namely, using 4 parts of N,N'-diphenyl-N,N' -bis(3-methylphenyl)-[1,1'-biphenyl]-4, 4'-dismine, it is dissolved along with 8 parts of polycarbonate X resin (viscosity-mean molecular weight=39,000) in 40 parts of monochlorobenzene. The coated composition obtained is coated on the charge generating layer by a did coating device and dried under heat at 100° C. for 60 minutes to form a charge transporting layer having a thickness of 20 μm and to prepare an electrophotographic photoreceptor.

EXAMPLE 7

A photoreceptor was prepared in the same manner as in Example 6 except that the chlorogallium phthalocyanine crystals obtained in Example 2 was used In place of those obtained in Example 1 as a charge generating material.

EXAMPLE 8

A photoreceptor was prepared in the same manner as in Example 6 except that the chlorogallium phthalocyanine crystals obtained in Example 3 was used in place of those obtained In Example 1 as a charge generating material.

EXAMPLE 9

A photoreceptor was prepared in the same manner as In Example 8 except that the chlorogallium phthalocyanine crystals obtained In Example 4 was used In place of those obtained in Example 1 as a charge generating material.

EXAMPLE 10

A photoreceptor was prepared In the same manner as in Example 6 except that the chlorogallium phthalocyanine crystals obtained in Example 5 was used in place of those obtained in Example 1 as a charge generating material.

COMPARATIVE EXAMPLE 1

A photoreceptor was prepared in the same manner as in Example 6 except that the chlorogallium phthalocyanine crystals obtained in Synthesis Example 1 was used In place of those obtained in Example 1 as a charge generating material.

COMPARATIVE EXAMPLE 2

A photoreceptor was prepared in the same manner as in Example 6 except that the chlorogallium phthalocyanine crystals obtained in Synthesis Example 2 was used in place of those obtained in Example 1 as a charge generating material.

COMPARATIVE EXAMPLE 3

A photoreceptor was prepared in the same manner as in Example 6 except that the chlorogallium phthalocyanine crystals obtained in Synthesis Example 3 was used in place Using a laser printer reconstructed scanner (XP-15 reconstructed device, manufactured by Fiji Xerox Co.) for the electrophotographic photoreceptor, a process comprising (A) charging by a grid applied voltage-600V scorotron charger, (B) discharging by Irradiating a 12.0 erg/cm$_2$ light after one second, and (C) deleting charges by irradiating a 50 erg/cm$_2$ red LED light after 3 seconds is employed to measure each potential of each part. In the estimations, if the potential VH of (A) is higher, the received potential of the photoreceptor becomes higher, a high contrast may be obtained. If the potential VL of (B) is lower, sensitivity becomes higher, and if the potential VRP of (C) is lower, the residual potential becomes lower, a photoreceptor has a low image memory and fog.

Further, the charging and exposure cycle was repeated 5,000 times and potential at each part was measured. In addition, using a laser printer (XP-11, manufactured by Fuji Xerox Co.) for these electrophotographic photoreceptor, an image quality under a condition of 30° C. and 85%RH was estimated. The results of them are shown in Table 1.

TABLE 1

| Photo-receptor | Charge generating material | Dispers-ibility | Initial Potential | | | Potential after 5,000 times repeating | | | Image Quality |
| --- | --- | --- | --- | --- | --- | --- | --- | --- | --- |
| | | | Potential A VH (V) | Potential B VL (V) | Potential C VRP (V) | Potential A VH (V) | Potential B VL (V) | Potential C VRP (V) | |
| Example 6 | Example 1 | GOOD | −585 | −140 | −85 | −580 | −125 | −70 | GOOD |
| Example 7 | Example 2 | GOOD | −590 | −90 | −30 | −570 | −80 | −25 | GOOD |
| Example 8 | Example 3 | GOOD | −585 | −70 | −20 | −575 | −60 | −15 | GOOD |
| Example 9 | Example 4 | GOOD | −590 | −130 | −75 | −570 | −115 | −60 | GOOD |
| Example 10 | Example 5 | GOOD | −595 | −135 | −80 | −580 | −110 | −70 | GOOD |
| Comparative Example 1 | Synthesis Example 1 | POOR | −576 | −140 | −85 | −575 | −110 | −60 | Black spots occurred. |
| Comparative Example 2 | Synthesis Example 2 | POOR | −580 | −95 | −30 | −580 | −40 | −25 | Black spots occurred. |
| Comparative Example 3 | Synthesis Example 3 | POOR | −575 | −75 | −25 | −575 | −50 | −20 | Black spots occurred. |
| Comparative Example 4 | Synthesis Example 4 | POOR | −580 | −130 | −80 | −580 | −90 | −50 | Black spots occurred. |
| Comparative Example 5 | Synthesis Example 5 | POOR | −580 | −140 | −90 | −580 | −95 | −55 | Black spots occurred. | of those obtained In Example 1 as a charge generating material.

COMPARATIVE EXAMPLE 4

A photoreceptor was prepared in the same manner as in Example 6 except that the chlorogallium phthalocyanine crystals obtained in Synthesis Example 4 was used in place of those obtained in Example 1 as a charge generating material.

COMPARATIVE EXAMPLE 5

A photoreceptor was prepared in the same manner as in Example 6 except that the chlorogallium phthalocyanine crystals obtained in Synthesis Example 5 was used in place of those obtained in Example 1 as a charge generating material.

The modified gallium phthalocyanine halide of the present invention is those in which a part of the crystals are changed into hydroxygallium phthalocyanine. Thus an electrophotographic photoreceptor containing it as a charge generating material in a charge generating layer shows a high sensitive and good electrophotographic characteristics and has a good image characteristics having no fog or black spots. In addition, the method for preparing the modified gallium phthalocyanine halide crystals of the present invention comprises simple processes and thus requires no complicated equipments and enables the decrease of the manufacturing cost to obtain a modified gallium phthalocyanine halide crystals having a good characteristics stably.

What is claimed is:

1. Gallium phthalocyanine halide crystals wherein a part of the crystal is changed into hydroxygallium phthalocyanine and wherein the halogen content in the gallium phthalocyanine halide crystals is 10 to 99.9% by weight.

2. A method for preparing gallium phthalocyanine halide crystals (ii), having a percentage of halide changed to hydroxy, comprising contacting gallium phthalocyanine halide crystals (i) with water to change a part of the crystals (i) into hydroxy gallium phthalocyanine (ii) wherein the halogen content in the gallium phthalocyanine halide crystals (ii) is 10 to 99.9% by weight.

3. An electrophotographic photoreceptor formed by laminating at least a charge generating layer and a charge transporting layer successively on a conductive support wherein the charge generating layer contains gallium phthalocyanine halide crystals in which a part of the crystals is changed into hydroxygallium phthalocyanine and wherein the halogen content in the gallium phthalocyanine halide crystals is 10 to 99.9% by weight.

4. An electrophotographic photoreceptor as claimed in claim 3 wherein the gallium phthalocyanine halide crystals have at least distinct diffraction peaks at 11.0°, 13.5° and 27.1° of the Bragg angle (2θ±0.2°) with respect to CuKα characteristic X-ray.

5. An electrophotographic photoreceptor as claimed In claim 3 wherein the gallium phthalocyanine halide crystals have at least distinct diffraction peaks at 7.4°, 16.6°, 25.5° and 28.3° of the Bragg angle (2θ±0.2°) with respect to CuKα characteristic X-ray.

6. An electrophotographic photoreceptor as claimed in claim 3 wherein the gallium phthalocyanine halide crystals have at least distinct diffraction peaks at 6.8°, 17.3°, 23.6° and 26.° of the Bragg angle (2θ±0.2°) with respect to CuKα characteristic X-ray.

7. Gallium phthalocyanine halide crystals as claimed in claim 1 having (1) distinct diffraction peaks at 11.0°, 13.5° and 27.1° of the Bragg angle (2 θ±0.2°), (2) distinct diffraction peaks at 7.4°, 16.6°, 25.5° and 28.3° of the Bragg angle (2θ±0.2°), (3) distinct diffraction peaks at 6.8°, 17.3°, 23.6° and 26.9° of the Bragg angle (2θ±0.2°) or (4) distinct diffraction peaks at 8.7° to 9.2°, 17.6°, 27.4° and 28.8° of the Bragg angle (2θ±0.2°).

8. Gallium phthalocyanine halide crystals as claimed in claim 1 wherein said halide content is 50 to 99% by weight.

9. Gallium phthalocyanine halide crystals as claimed in claim 1 wherein said halide content is 80 to 95% by weight.

10. The method of claim 2, comprising condensing 1,3-diimino isoindoline and gallium trichloride quinoline to form said gallium phthalocyanine halide crystals (i).

11. The method of claim 2, wherein the gallium phthalocyanine halide crystals (i) are brought into contact with water by stirring in water, or agitation and dispersion in water.

12. The method of claim 2, wherein said water is deionized water or distilled water.

13. The method of claim 2, further comprising dry grinding said gallium phthalocyanine halide crystals (i) in a vibration mill, an automatic mortar, a sand mill, an attritor or a ball mill.

14. The method of claim 2, further comprising wet grinding said gallium phthalocyanine halide crystals (i) in a solvent selected from the group consisting of benzyl alcohol, isopropyl alcohol, cyclohexanone, toluene, dimethylsulfoxide and butyl acetate to produce gallium phthalocyanine halide crystals having distinct diffraction peaks at 7.4°, 16.6°, 25.5° and 28.3° of the Bragg angle (2θ±0.2°) and contacting said crystals having distinct diffraction peaks with water to change said crystals to (ii).

15. The method of claim 2, further comprising wet grinding said gallium phthalocyanine halide crystals (i) in a halide solvent selected from the group consisting of methylene chloride, chloroform, carbon tetrachloride, 1,1,1-trichloroethane and 1,1,2-trichloroethylene to produce crystals having distinct diffraction peaks at 6.8°, 17.3°, 23.6° and 26.9° of the Bragg angle (2θ± 0.2°) and contacting said crystals having distinct diffraction peaks with water to change said crystals to (ii).

16. The method of claim 2, further comprising grinding said gallium phthalocyanine halide crystals (i) in methanol or ethanol to produce gallium phthalocyanine halide crystals having distinct diffraction peaks at 8.7° to 9.2°, 17.6°, 27.4° and 28.8° of the Bragg angle (2θ±0.2°) and contacting said crystals having distinct diffraction peaks with water to to change said crystals to (ii).

17. An electrophotographic photoreceptor, comprising a charge generation layer comprising the crystal of claim 7.

18. An electrophotographic photoreceptor, comprising a charge generation layer comprising the crystal of claim 1.

19. An electrophotographic photoreceptor, comprising a charge generation layer comprising the crystal of claim 8.

20. An electrophotographic photoreceptor, comprising a charge generation layer comprising the crystal of claim 9.

21. An electrophotographic photoreceptor as claimed in claim 3, wherein the gallium phthalocyanine halide crystals have at least distinct diffraction peaks at 8.7° to 9.2°, 17.6°, 27.4° and 28.8° of the Bragg angle (2θ±0.2°).

* * * * *